(12) United States Patent
Lee et al.

(10) Patent No.: US 12,204,812 B2
(45) Date of Patent: *Jan. 21, 2025

(54) ELECTRONIC DEVICE AND METHOD FOR RECOGNIZING AUDIO OUTPUT DEVICE CONNECTED TO USB TYPE-C CONNECTOR

(71) Applicant: Samsung Electronics Co., Ltd., Suwon-si (KR)

(72) Inventors: Wookwang Lee, Suwon-si (KR); Kyounghoon Kim, Suwon-si (KR); Hyungsik Park, Suwon-si (KR); Dongrak Shin, Suwon-si (KR); Youngjung Yoon, Suwon-si (KR); Jaejin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,431

(22) Filed: Sep. 7, 2023

(65) Prior Publication Data

US 2023/0418545 A1 Dec. 28, 2023

Related U.S. Application Data

(63) Continuation of application No. 17/248,861, filed on Feb. 10, 2021, now Pat. No. 11,768,656.

(30) Foreign Application Priority Data

Feb. 10, 2020 (KR) .................. 10-2020-0015654

(51) Int. Cl.
*G06F 3/16* (2006.01)
*G06F 13/42* (2006.01)
*H04R 3/00* (2006.01)

(52) U.S. Cl.
CPC .............. *G06F 3/162* (2013.01); *G06F 3/165* (2013.01); *G06F 13/4282* (2013.01); *H04R 3/00* (2013.01);
(Continued)

(58) Field of Classification Search
CPC ...... G06F 3/162; G06F 3/165; G06F 13/4282; G06F 2213/0042; H04R 3/00; H04R 2420/05; H04R 2420/09
See application file for complete search history.

(56) References Cited

U.S. PATENT DOCUMENTS 9,009,373 B2    4/2015   Li
9,414,147 B2    8/2016   Gu et al.
(Continued)

FOREIGN PATENT DOCUMENTS

CN       105142077 A       12/2015
CN       106528041 A        3/2017
(Continued)

OTHER PUBLICATIONS

International Search Report of the International Searching Authority in connection with International Application No. PCT/KR2021/001034 issued Apr. 29, 2021, 3 pages.
(Continued)

*Primary Examiner* — Joseph Saunders, Jr.

(57) ABSTRACT

Embodiments of an electronic device are disclosed. The electronic device may include a USB Type-C connector including at least one configuration channel (CC) pin and a processor operatively connected to the USB Type-C connector. The processor may be configured to: obtain first information of a connected audio output device by using a USB driver; transmit the first information and/or audio card information of the audio output device to an audio framework through a USB framework; control the audio framework through a USB framework; control the audio frame- (Continued)

work to access an interface corresponding to the audio card information; and activate, when at least a portion of second information of the audio output device is obtained through the USB driver while accessing the interface, the interface by transmitting the at least a portion of the second information to the audio framework through the USB framework. Various additional embodiments in addition to the disclosed embodiments are possible.

20 Claims, 12 Drawing Sheets

(52) U.S. Cl.
CPC .. *G06F 2213/0042* (2013.01); *H04R 2420/05* (2013.01); *H04R 2420/09* (2013.01)

(56) References Cited

U.S. PATENT DOCUMENTS

| | | | |
|---|---|---|---|
| 10,198,386 | B2 | 2/2019 | Rand et al. |
| 10,283,920 | B2 | 5/2019 | Chung et al. |
| 10,397,702 | B2 | 8/2019 | Lee |
| 11,556,163 | B2 | 1/2023 | Chung et al. |
| 2008/0195768 | A1* | 8/2008 | Lowe .................. G06F 9/4415 710/14 |
| 2012/0059496 | A1 | 3/2012 | Gong et al. |
| 2012/0303846 | A1 | 11/2012 | Li |
| 2013/0129109 | A1 | 5/2013 | Jung |
| 2013/0259246 | A1 | 10/2013 | Kang |
| 2016/0219359 | A1 | 7/2016 | Kim et al. |
| 2016/0364360 | A1 | 12/2016 | Lim |
| 2017/0127203 | A1 | 5/2017 | Ryu |
| 2017/0222459 | A1 | 8/2017 | Kang |
| 2017/0371681 | A1 | 12/2017 | Kulkarni et al. |
| 2018/0060270 | A1 | 3/2018 | Schnell et al. |
| 2018/0276178 | A1 | 9/2018 | Lee et al. |
| 2018/0302507 | A1 | 10/2018 | Johnson et al. |
| 2019/0257869 | A1 | 8/2019 | Lee et al. |
| 2020/0226085 | A1 | 7/2020 | Wang et al. |

FOREIGN PATENT DOCUMENTS

| | | | |
|---|---|---|---|
| CN | 108028989 | A | 5/2018 |
| CN | 109121038 | A | 1/2019 |
| EP | 2530599 | A1 | 12/2012 |
| JP | 5531256 | B2 | 6/2014 |
| JP | 2018-182992 | A | 11/2018 |
| KR | 10-1267047 | B1 | 5/2013 |
| KR | 10-2016-0092736 | A | 8/2016 |
| KR | 10-2016-0145414 | A | 12/2016 |
| KR | 10-2016-0148401 | A | 12/2016 |
| KR | 10-2018-0045416 | A | 5/2018 |
| KR | 10-2018-0056218 | A | 5/2018 |
| KR | 10-1874888 | B1 | 7/2018 |
| KR | 10-1945174 | B1 | 2/2019 |
| WO | 2019075620 | A1 | 4/2019 |
| WO | 2019107894 | A1 | 6/2019 |

OTHER PUBLICATIONS

European Patent Office, "Supplementary European Search Report," dated May 22, 2023, in connection with European Patent Application No. 21754371.9, 12 pages.

The First Office Action dated Dec. 5, 2023, in connection with Chinese Application No. 202180013633.4, 26 pages.

Office Action dated Jul. 30, 2024, in connection with Korean Patent Application No. 10-2020-0015654, 10 pages.

Notification of Due Registration Formalities dated May 23, 2024, in connection with Chinese Patent Application No. 202180013633.4, 8 pages.

\* cited by examiner

ELECTRONIC DEVICE AND METHOD FOR RECOGNIZING AUDIO OUTPUT DEVICE CONNECTED TO USB TYPE-C CONNECTOR

CROSS-REFERENCE TO RELATED APPLICATIONS

This application is a continuation of application Ser. No. 17/248,861, filed Feb. 10, 2021, which is based on and claims priority under 35 U.S.C. § 119 to Korean Patent Application No. 10-2020-0015654, filed on Feb. 10, 2020, in the Korean Intellectual Property Office, the disclosures of which are incorporated by reference herein in their entirety.

BACKGROUND

1. Field

Various embodiments of this disclosure relate to an electronic device and a method for recognizing an audio output device connected to a USB Type-C connector.

2. Description of Related Art

Recently, electronic devices have become thinner to enhance aesthetics. To provide a thin electronic device, a 3.5 mm terminal for connecting an earphone or a headset may be removed. Such an electronic device may implement a scheme for connecting an audio output device (e.g., earphone or headset) by using a USB Type-C connector instead of a 3.5 mm terminal. An electronic device connected to an audio output device through a USB Type-C connector may transmit and receive control signals to and from the audio output device through a configuration channel (CC) defined in the USB Type-C specification.

SUMMARY

When an audio output device is connected through the USB Type-C connector of the electronic device while an audio signal is output through the speaker of the electronic device, the electronic device may change the audio signal output path from the speaker of the electronic device to the audio output device.

However, even after the audio output device is connected through the USB Type-C connector while an audio signal is being output through the speaker of the electronic device, as the recognition process of the audio output device lengthens, a sound leakage phenomenon where the audio signal is output through the speaker of the electronic device for a certain period of time may occur.

According to various embodiments of the disclosure, when an audio output device is connected through the USB Type-C connector of the electronic device while an audio signal is being output through the speaker, the electronic device can transmit in advance information necessary for recognizing the audio output device to the audio framework that processes the audio signal.

According to various embodiments of the disclosure, there is provided an electronic device. The electronic device may include: a USB Type-C connector including at least one configuration channel (CC) pin; and a processor operatively connected to the USB Type-C connector, wherein the processor is configured to: obtain, when an audio output device is connected to the USB Type-C connector, first information of the audio output device by using a USB driver; transmit the first information and/or audio card information of the audio output device to an audio framework through a USB framework; control the audio framework to access an interface corresponding to the audio card information based on the first information and/or the audio card information of the audio output device; and activate, when at least a portion of second information of the audio output device is obtained through the USB driver while accessing the interface, the interface by transmitting the at least a portion of the second information to the audio framework through the USB framework.

According to various embodiments of the disclosure, a method for an electronic device to recognize an audio output device is disclosed. The method may include: obtaining first information of the audio output device in response to connection of the audio output device to a USB Type-C connector including at least one configuration channel (CC) pin; transmitting the first information and/or audio card information of the audio output device to an audio framework through a USB framework; accessing an interface corresponding to the audio card information based on the first information and/or the audio card information of the audio output device; and activating the interface when at least a portion of second information of the audio output device is obtained while accessing the interface and the at least a portion of the second information is transmitted to the audio framework through the USB framework.

According to various embodiments of the disclosure, when an audio output device is connected through a USB Type-C connector, the electronic device may transmit in advance information necessary for recognition of the audio output device to an audio framework that processes audio signals, shortening the time required to recognize the audio output device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
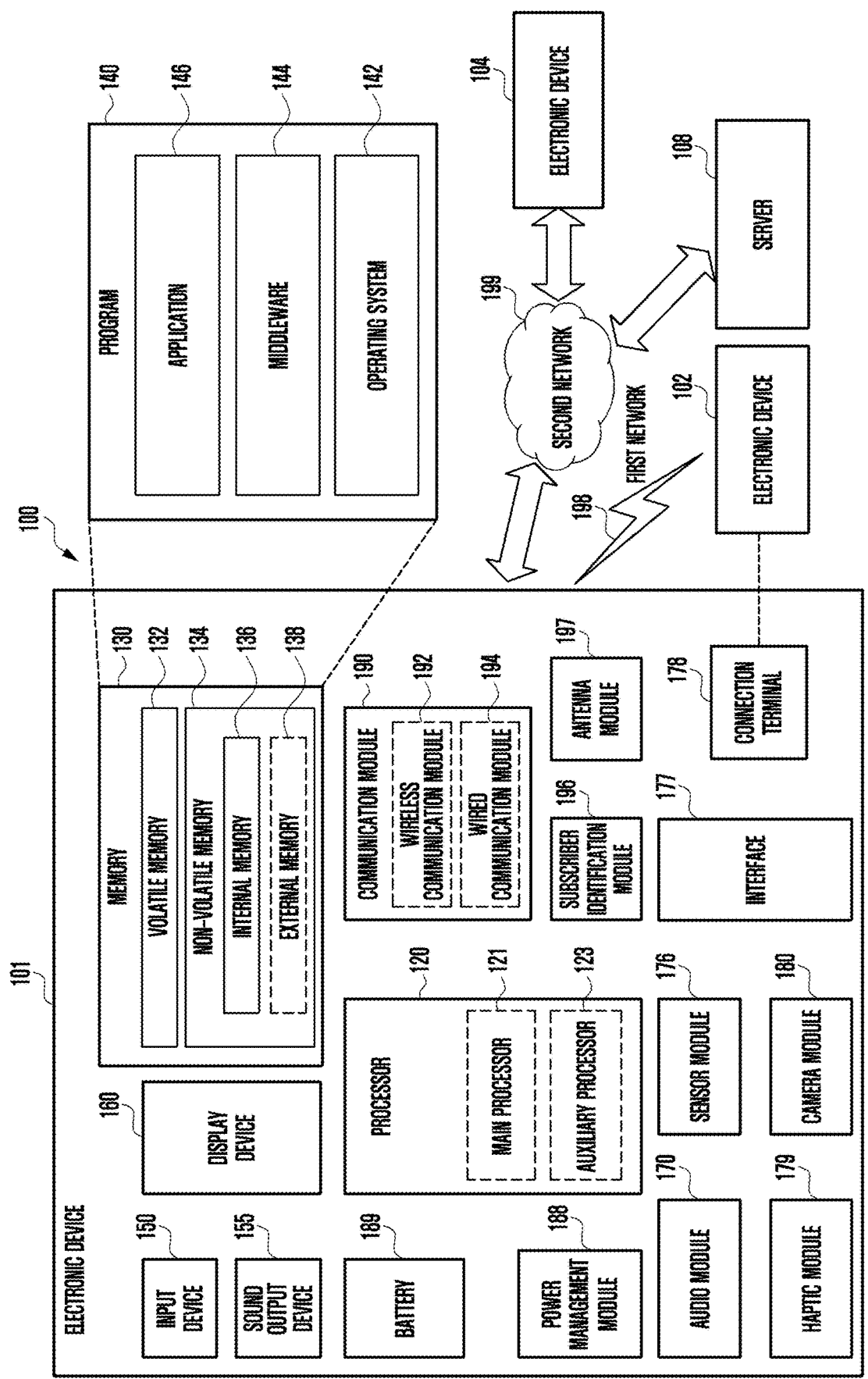
FIG. 1 illustrates a block diagram of an electronic device in a network environment according to various embodiments.

FIG. 1 is a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
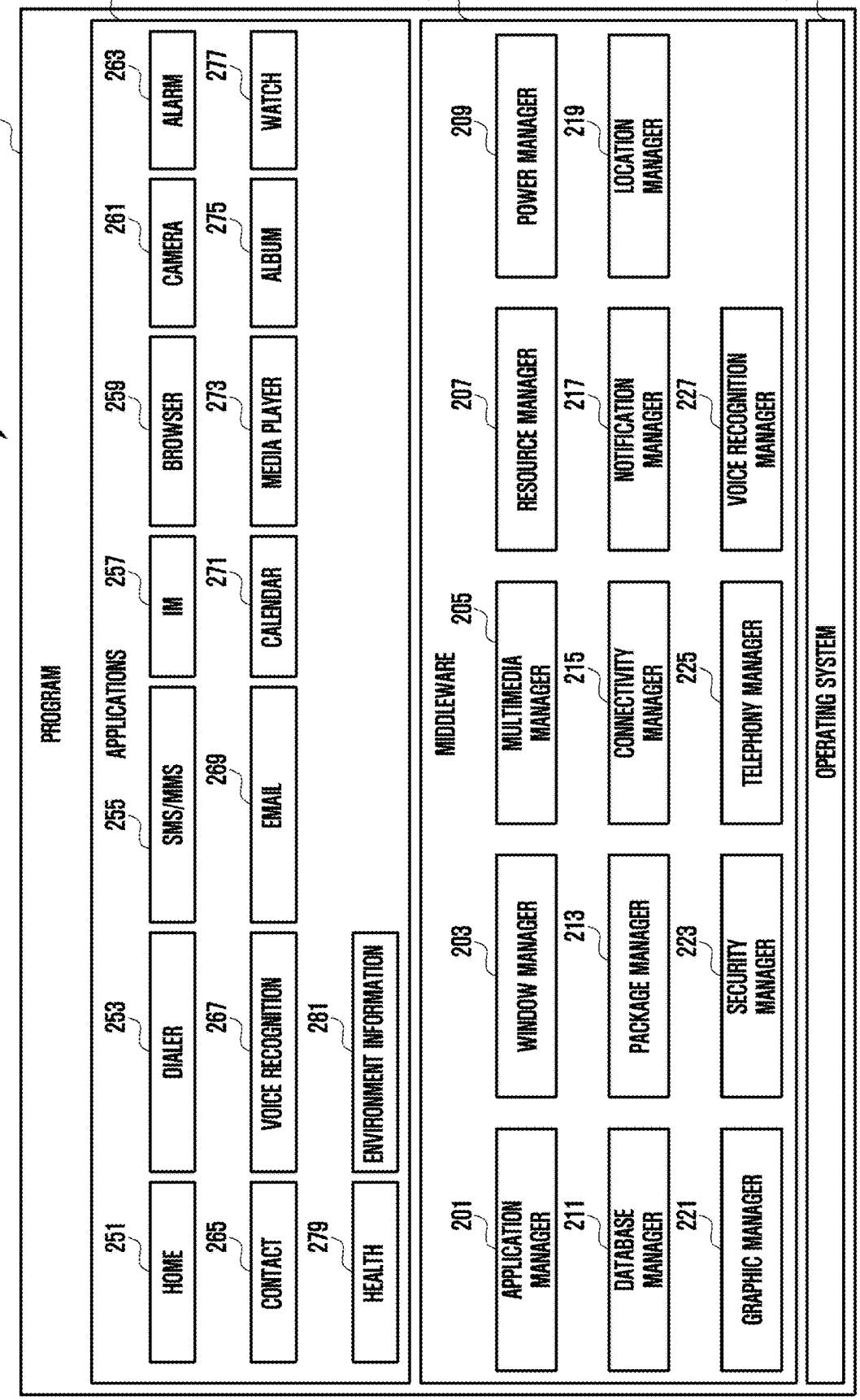
FIG. 2 illustrates a block diagram illustrating the program according to various embodiments.

FIG. 2 is a block diagram 200 illustrating the program 140 according to various embodiments.

According to an embodiment, the program 140 may include an operating system (OS) 142 to control one or more resources of the electronic device 101, middleware 144, or an application 146 executable in the OS 142. The OS 142 may include, for example, Android, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device 160 or a camera module 180 of the external electronic device). The device management application, additionally or alternatively, may support installation, delete, or update of an application running on the external electronic device.

Figure 3:
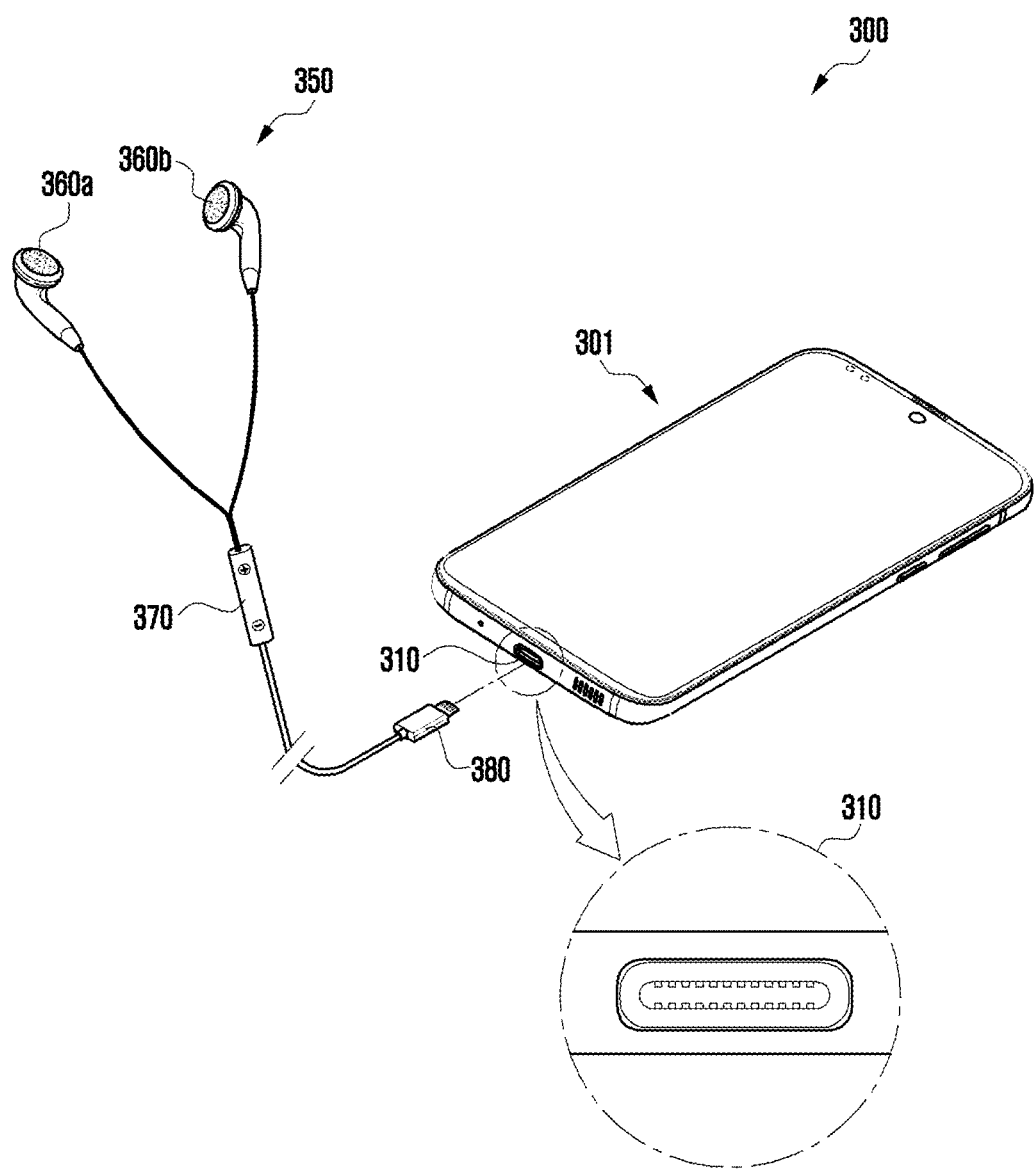
FIG. 3 illustrates an electronic device and an audio output device according to various embodiments.

FIG. 3 illustrates a block diagram 300 illustrating an electronic device 301 and an audio output device 350 according to various embodiments.

With reference to FIG. 3, the electronic device 301 (e.g., electronic device 101 in FIG. 1) may include a connector 310 (e.g., universal serial bus (USB) connector) to which the audio output device 350 can be connected. The electronic device 301 may transmit and receive data (e.g., multimedia data such as audio data, or control command signals) to and from the audio output device 350 connected through the connector 310.

In one embodiment, the electronic device 301 may include an opening formed on one surface of the housing and a hole connected to the opening, and the connector 310 (e.g., interface 177 in FIG. 1) may be disposed inside the hole. However, without being limited thereto, the connector 310 may be disposed on the other surface of the housing of the electronic device 301.

In one embodiment, the audio output device 350 may include speakers 360a and 360b for outputting audio, a processor 370 including a circuit for controlling audio output, and a connector 380. The components constituting the audio output device 350 will be described in detail with reference to FIG. 5.

In one embodiment, the connector 310 may be a connector of the USB Type-C specification. However, it is not limited thereto. For example, the connector 310 may conform to various standard or non-standard wired interfaces such as high definition multimedia interface (HDMI), recommended standard 232 (RS-232), power line communication, or plain old telephone service (POTS).

Figure 4A:
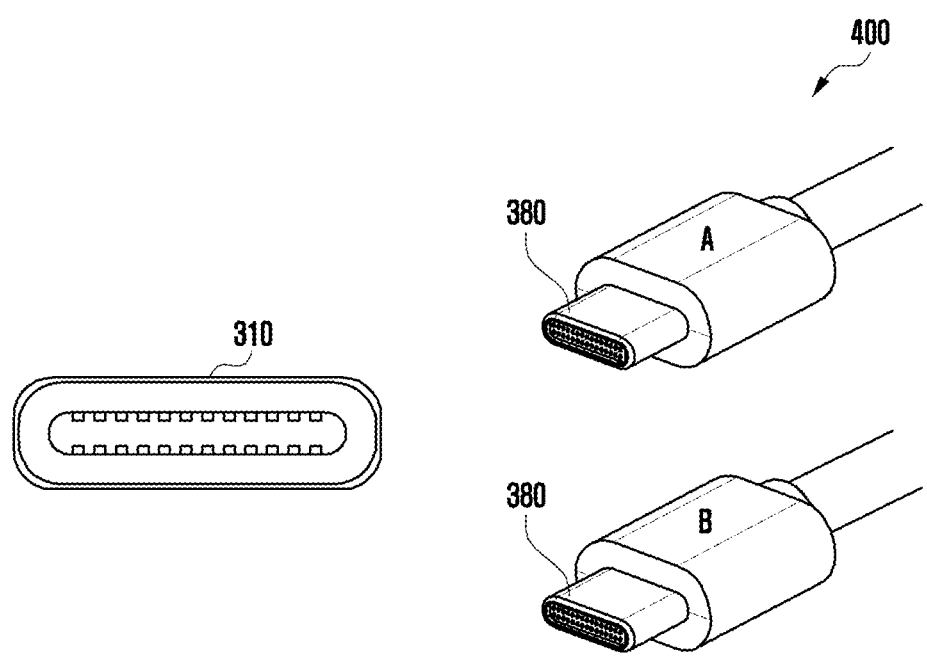
FIGS. 4A and 4B illustrate the pin configuration of a connector of the electronic device according to various embodiments.
Figure 4B:
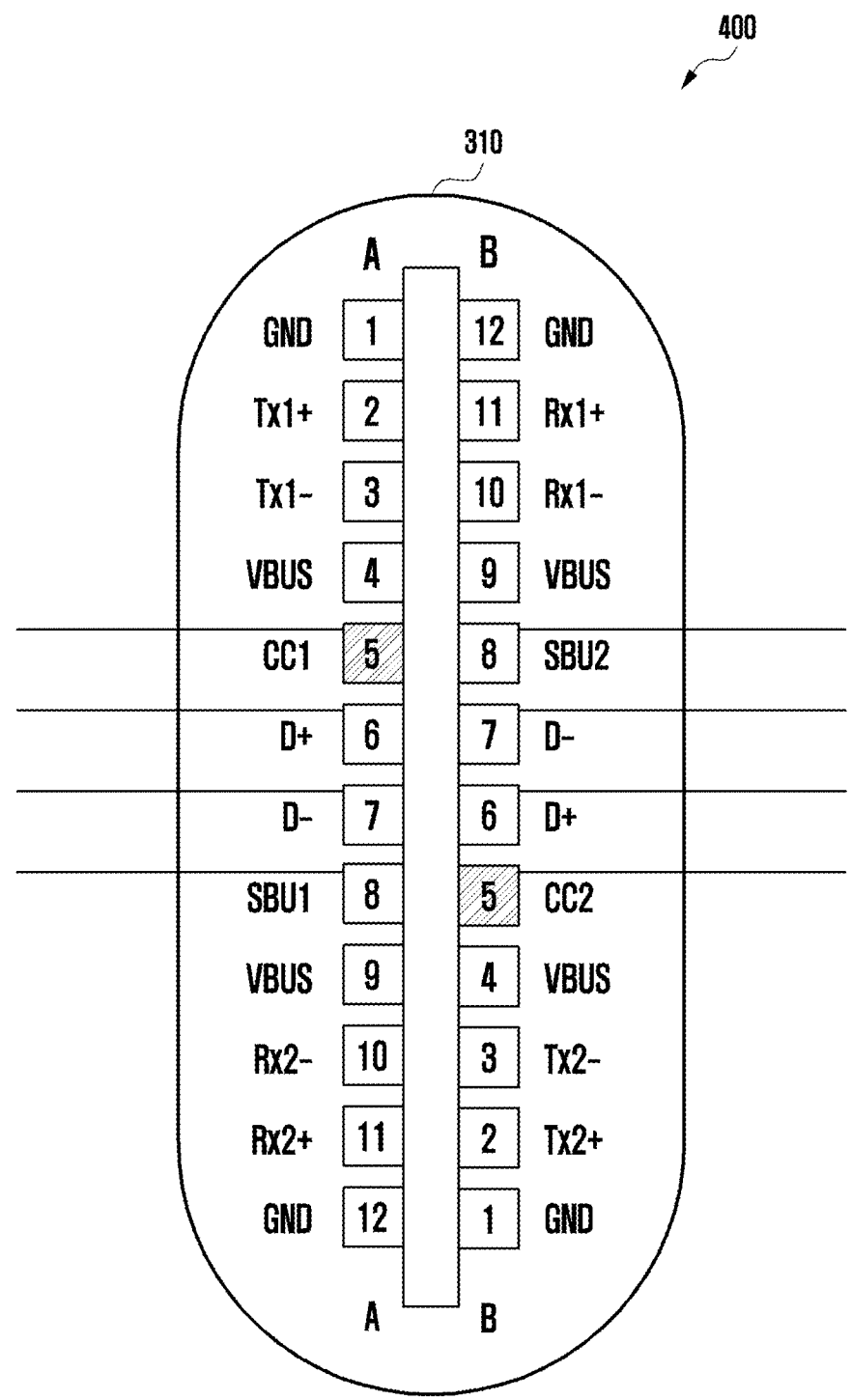

FIGS. 4A and 4B illustrate diagrams 400 showing the pin configuration of the connector 310 of the electronic device 301 according to various embodiments.

In one embodiment, the connector (e.g., connector 380) of the audio output device (e.g., audio output device 350 in FIG. 3) may be inserted into the connector (e.g., connector 310 in FIG. 3) of the electronic device 301 (e.g., electronic device 101 in FIG. 1). The connector 380 of the audio output device 350 may be accommodated through the hole of the electronic device 301 to physically contact the connector 310 of the electronic device 301. Due to this physical contact, the electronic device 301 and the audio output device 350 may be electrically connected. In one embodiment, the connector 310 may have a structure into which a USB Type-C connector can be inserted.

In one embodiment, the structure of the connector 310 and the hole of the electronic device 301 may have a reversible configuration. The connector 310 of the electronic device 301 may be symmetrical with respect to a first direction perpendicular to the orientation in which the audio output device 350 is inserted (e.g., direction from the bottom of the electronic device 301 to the top) and a second direction opposite to the first direction. For example, with reference to FIG. 4A, the connector 380 of the audio output device 350 may be inserted into the connector 310 of the electronic device 301 in an orientation where one surface (e.g., surface A) is parallel to the front surface (e.g., surface on which the display is located) of the electronic device 301. As another example, the connector 380 of the audio output device 350 may be inserted into the connector 310 of the electronic device 301 in an orientation where the other surface (e.g., surface B) is parallel to the front surface of the electronic device 301.

With reference to FIG. 4B, the connector 310 of the USB Type-C specification may include a plurality of terminals defined in the USB Type-C specification.

In one embodiment, the plural terminals of the USB Type-C specification may include 12 terminals on each of the A and B lines, and may be symmetrical to each other. The line electrically connected between the plural terminals of the connector 310 and the connector terminals of the audio output device 350 may differ according to the orientation in which the connector 380 of the audio output device 350 is inserted.

In one embodiment, terminals CC1 (configuration channel 1) and CC2 (configuration channel 2) included in the USB Type-C specification may be used as a port for detecting connector insertion/removal and identifying the connector connection mode. For example, when the electronic device 301 and the audio output device 350 are connected through the connector 310, an electrical signal (e.g., digital ID or resistor ID) is exchanged through terminals CC1 and CC2, and the electronic device 301 may detect the insertion or removal of the audio output device 350 accordingly. Based on the value detected through at least one of terminals CC1 and CC2, the electronic device 301 may control the connector connection mode to operate in downstream facing port (DFP) mode (e.g., data transmitting mode), upstream facing port (UFP) mode (e.g., data receiving mode), source mode (e.g., power transmitting mode), and/or sink mode (e.g., power receiving mode).

In one embodiment, terminal GND (ground) (e.g., A1/B12, B1/A12) and terminal VBUS (e.g., A4/A9, B4/B9) may be a port used for power. For example, terminal VBUS may be used to supply power from the electronic device 301 to the audio output device 350 connected through the connector 310.

In one embodiment, terminals TX1+/−, TX2+/−, RX1+/− and RX2+/− (e.g., A2/A3, B2/B3, B11/B10, and A11/A10) may be used as a port for high-speed data communication according to the USB Type-C specification. For example, when an external electronic device, such as the audio output device 350, capable of directly transmitting and receiving PCM data being a digital signal is connected to the connector 310, PCM data can be transmitted and received through terminals TX1+/−, TX2+/−, RX1+/− and RX2+/−.

In one embodiment, terminals D+ and D− (e.g., A6/B6 and A7/B7) may be a port for transmitting and receiving data (e.g., USB packets).

In one embodiment, when the electronic device 301 transmits an audio signal to the audio output device 350 after the audio output device 350 is connected to the connector 310, one of the left audio signal (L) and the right audio signal (R) can be transmitted through terminals A6/B6 (D+), and the other one of the left audio signal (L) or the right audio signal (R) can be transmitted through terminals A7/B7 (D−). The L/R audio signal may be an analog signal.

According to various embodiments, the role of each terminal in various operation modes is defined by the USB Type-C standard, and a detailed description of the role of each terminal will be omitted.

Figure 5:
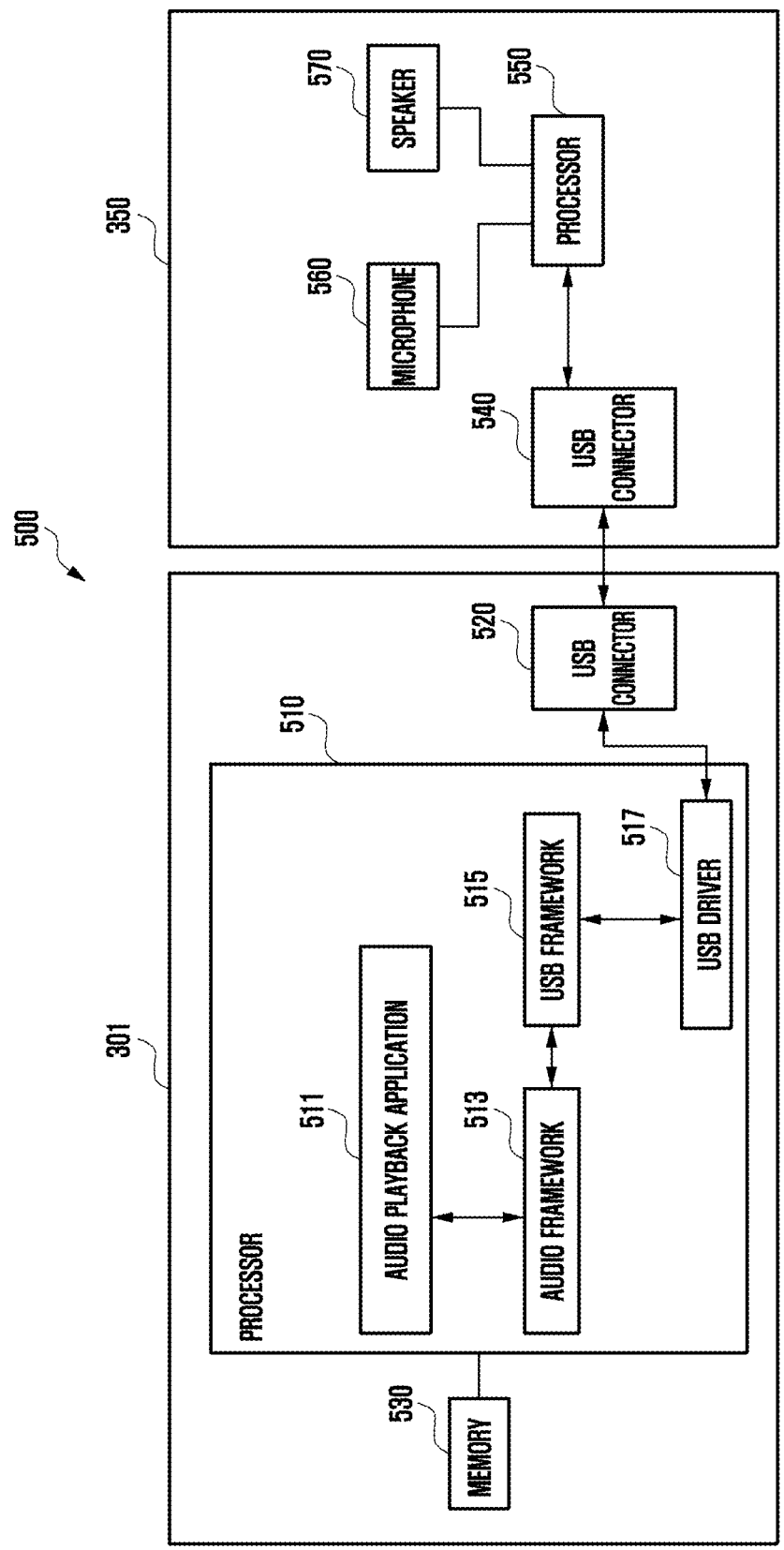
FIG. 5 illustrates a block diagram of the electronic device and the audio output device according to various embodiments.

FIG. 5 illustrates a block diagram 500 of the electronic device 301 and the audio output device 350 according to various embodiments.

With reference to FIG. 5, in various embodiments, the electronic device (e.g., electronic device 301 in FIG. 3) may include a processor 510, a USB connector 520 (e.g., connector 310 in FIG. 3), and a memory 530. The audio output device (e.g., audio output device 350 in FIG. 3) may include a USB connector 540 (e.g., connector 380 in FIG. 3), a processor 550, a microphone 560, and a speaker 570.

In various embodiments, the electronic device 301 may be electrically connected to the audio output device 350 through various input/output interfaces (e.g., peripheral component interconnect express (PCIe) interface, lightning interface, or USB interface).

In the following embodiments, it is assumed that the electronic device 301 is connected to the audio output device 350 through a USB interface.

In various embodiments, the electronic device 301 may be electrically connected to the audio output device 350 through the USB connector 520. For example, the connector 540 of the audio output device 350 may be accommodated through the hole of the electronic device 301 to be in physical contact with the USB connector 520 of the electronic device 301, and the electronic device 301 and the audio output device 350 may be electrically connected according to the physical contact.

In one embodiment, the USB connector 520 may be implemented in the form of USB Type-C. However, it is not limited thereto.

In various embodiments, the processor 510 of the electronic device 301 may detect that the audio output device 350 is connected to the USB connector 520. The USB driver 517 of the processor 510 may check the resistance value detected at the CC pin when the audio output device 350 is fastened to the USB connector 520, and may identify the type (e.g., earphone) of the audio output device 350 based on the resistance value (e.g., 5.1 k). The processor 510 may supply power for the operation of the audio output device 350 to the audio output device 350 through a port (e.g., VBUS port) for power supply.

In various embodiments, when the audio output device 350 is connected to the USB connector 520, the processor 510 may perform a series of preparation operations (e.g., enumeration) for data transmission between the electronic device 301 and the audio output device 350. During a series of preparation operations for data transmission between the electronic device 301 and the audio output device 350, the processor 510 may obtain information on the audio output device 350. The information on the audio output device 350 may include vendor identification (VID) indicating manufacturer information of the audio output device 350, product identification (PID) indicating the product, and device descriptor information indicating the number of interfaces supported by the audio output device 350, a sample rate, channel information, and/or a bit rate.

In one embodiment, in response to the connection of the audio output device 350 to the USB connector 520, the USB driver 517 may transmit some of the obtainable information about the audio output device 350, such as VID, PID, and/or audio card information to be generated, to the audio framework 513 via the USB framework 515. As some of the information about the audio output device 350 is transmitted to the audio framework 513, to shorten the time to recognize the audio output device 350, the audio framework 513 for processing an audio signal through the audio output device 350 may be put into the ready state.

In one embodiment, the audio framework 513 may access at specified time intervals to open an audio card to be generated based on the VID, PID, and/or audio card information to be generated of the audio output device 350. For example, based on the VID, and/or audio card information to be generated of the audio output device 350, the audio framework 513 may access the interface for processing an audio signal corresponding to audio card information at specified time intervals to check whether the interface is activated. In one embodiment, when at least another portion of the information about the audio output device 350, such as the number of interfaces supported by the audio output device 350, the sample rate, channel information, and/or the bit rate, is obtained, the interface for audio signal processing may be activated. Upon activation of the interface for audio signal processing, the processor 510 may transmit an audio signal to the audio output device 350 through the activated interface.

In various embodiments, the processor 510 may control the function of the audio output device 350 based on a control signal, for example, a control signal using the audio playback application 511. The processor 510 may control the function of the audio output device 350, such as adjusting the volume of a sound corresponding to an audio signal output from the audio output device 350, based on various control signals.

In various embodiments, the audio playback application 511, the audio framework 513, the USB framework 515, and the USB driver 517 may be implemented on the processor 510.

In various embodiments, the audio output device 350 may include a USB connector 540, a processor 550, a microphone 560, and a speaker 570.

In one embodiment, the audio output device 350 may be electrically connected to the electronic device 301 through the USB connector 540 (e.g., connector 380 in FIG. 3). The USB connector 540 may be implemented in the form of USB Type-C. However, it is not limited thereto.

In various embodiments, the processor 550 may include an audio codec (not shown) that processes audio signals. The audio codec (not shown) may be implemented as a hardware component included in the processor 550. The processor 550 may perform various processing operations, such as audio signal amplification and sound quality improvement corresponding to an audio signal, based on a control signal received from the electronic device 301.

In various embodiments, the processor 550 may control the speaker 570 to output a sound corresponding to the processed audio signal. The processor 550 may include a digital-to-analog converter (DAC) that converts the processed audio signal into an analog signal. The processor 550 may generate a sound corresponding to a signal processed by using the DAC and control the speaker 570 to output the generated sound.

In various embodiments, the microphone 560 may pick up sound around the electronic device 301 or the audio output device 350 and convert the picked-up sound into a digital form.

According to various embodiments, the electronic device 301 may include: a USB Type-C connector 520 including at least one CC (configuration channel) pin; a processor 510 operatively connected to the USB Type-C connector 520; and a memory 530 operatively connected to the processor 510, wherein the processor 510 may be configured to: obtain, when an audio output device 350 is connected to the USB Type-C connector 520, first information of the audio output device 350 by using a USB driver 517; transmit the first information and/or audio card information of the audio output device 350 to an audio framework 513 through a USB framework 515; control the audio framework 513 to access an interface corresponding to the audio card information based on the first information and/or the audio card information of the audio output device 350; and activate, when at least a portion of second information of the audio output device 350 is obtained through the USB driver 517 while accessing the interface, the interface by transmitting the at least a portion of the second information to the audio framework 513 through the USB framework 515.

According to various embodiments, the first information of the audio output device 350 may include a vendor identification (VID) indicating manufacturer information of the audio output device 350 and a product identification (PID) indicating the product.

According to various embodiments, the electronic device 301 may further include a speaker (not shown), and the processor 510 may be configured to detect the connection of the audio output device 350 to the USB Type-C connector 520 while outputting an audio signal through the speaker (not shown).

According to various embodiments, the processor 510 may be configured to block the output of the speaker (not shown) after transmitting the first information and/or the audio card information to the audio framework 513 through the USB framework 515.

According to various embodiments, the processor 510 may be configured to unblock the blocked output of the speaker (not shown) in response to activation of the interface.

According to various embodiments, the second information of the audio output device 350 may include at least one of presence of a speaker, presence of a microphone, number of interfaces supported by the audio output device 350, sample rate for each interface, bit rate, channel information, or endpoint.

According to various embodiments, the processor 510 may be configured to: determine, after obtaining the first information, whether audio output device matching the first information is stored in the memory 530; obtain, if audio output device matching the first information is stored in the memory 530, the audio output device and audio card information corresponding thereto from the memory 530; and activate the interface based on the audio output device and the audio card information obtained from the memory 530.

According to various embodiments, the processor 510 may be configured to activate clock boosting upon connection of the audio output device 350 to the USB Type-C connector 520.

According to various embodiments, the processor 510 may be configured to deactivate activated clock boosting upon activation of the interface.

According to various embodiments, the processor 510 may be configured to: set the electronic device 301 to operate in a USB host mode; check, upon connection of the audio output device 350 to the USB Type-C connector 520, whether the resistance value detected at the CC pin is 5.1 k; and maintain the USB host mode and obtain first information of the audio output device 350 if the resistance value detected at the CC pin is 5.1 k.

According to various embodiments, the processor 510 may be configured to control the USB driver 517 or the power delivery integrated circuit (PDIC) driver to activate terminal VBUS of the USB Type-C connector 520 upon connection of the audio output device 350 to the USB Type-C connector 520.

Figure 6:
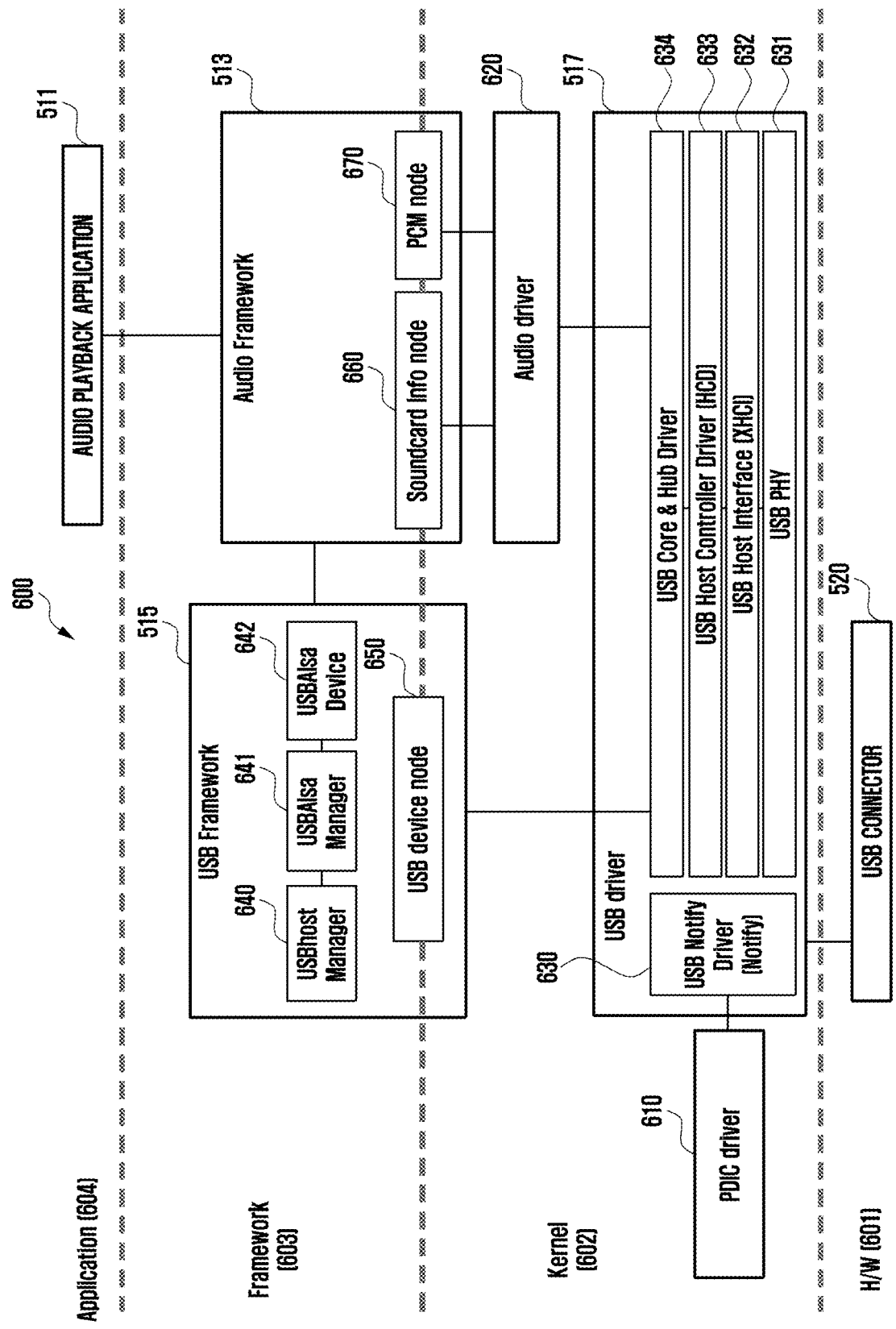
FIG. 6 illustrates software layers of the electronic device according to various embodiments.

FIG. 6 illustrates a diagram 600 illustrating software layers of the electronic device 301 according to various embodiments.

In one embodiment, the audio playback application 511, the audio framework 513, the USB framework 515, the USB driver 517, the PDIC driver 610, and the audio driver 620 may be implemented on the processor (e.g., processor 510). More specifically, the audio playback application 511 may be implemented on the application layer 604; the audio framework 513 and the USB framework 515 may be implemented on the framework layer 603; the PDIC driver 610, the USB driver 517, and the audio driver 620 may be implemented on the kernel layer 602; and the USB connector 520 may be implemented on the hardware (H/W) layer 601.

In one embodiment, the USB driver 517 may detect that an audio output device (e.g., audio output device 350 in FIG. 3) is connected to the USB connector 520. The USB driver 517 may check the resistance value detected at the CC pin after the audio output device 350 is fastened to the USB connector 520, and identify the type (e.g., earphone) of the audio output device 350 based on the resistance value (e.g., 5.1 k). The USB driver 517 may supply power for the operation of the audio output device 350 to the audio output device 350 through a port (e.g., VBUS port) that supplies power to the audio output device 350.

In one embodiment, the PDIC driver 610 may perform PD communication through the CC pin to determine a power role or a data role.

In one embodiment, when the audio output device 350 is connected to the USB connector 520, the USB driver 517 may perform a series of preparation operations (e.g., enumeration) for data transmission between the electronic device 301 and the audio output device 350.

In one embodiment, the USB driver 517 may create a node for the audio output device 350 to drive the audio output device 350 connected to the USB connector 520 by performing a series of preparation operations (e.g., enumeration) for data transmission between the electronic device 301 and the audio output device 350.

In one embodiment, the node for the audio output device 350 may include first information and second information. The first information of the audio output device 350 may include a vendor identification (VID) indicating manufacturer information of the audio output device 350 and a product identification (PID) indicating the product. The second information of the audio output device 350 may include information regarding presence of a speaker, presence of a microphone, number of interfaces supported by the audio output device 350, sample rate for each interface, bit rate, channel information, and/or endpoint.

In one embodiment, in response to connection of the audio output device 350 to the USB connector 520 of the electronic device 301, the USB driver 517 may obtain first information of the audio output device 350 while performing a series of preparation operations (e.g., enumeration). The USB driver 517 may transmit the first information of the audio output device 350 to the audio framework 513 through the USB framework 515. In one embodiment, the USB driver 517 may transmit card number information on which the audio output device 350 is to be generated together with the first information of the audio output device 350 to the audio framework 513 through the USB framework 515.

In one embodiment, when the first information and/or audio card information (e.g., card number information to be generated) of the audio output device 350 is transmitted to the audio framework 513 through the USB framework 515 in response to connection of the audio output device 350 to the USB connector 520 of the electronic device 301, the audio framework 513 may access to open a sound card of the audio output device 350 based on the first information and/or audio card information of the audio output device 350. For example, the audio card information is kernel interface information generated by the audio driver 620 and can be used when the audio framework 513 opens a card (e.g., sound card of the audio output device 350) in the kernel. In response to connection of the audio output device 350 to the USB connector 520, the USB driver 517 may transmit the card number information to be generated to the USB framework 515. The USB framework 515 may forward the card number information to be generated received from the USB driver 517 to the audio framework 513. The audio framework 513 may attempt to access and open an audio card corresponding to the card number information to be generated received from the USB framework 515.

In one embodiment, upon completion of a series of preparation operations (e.g., enumeration), the USB driver 517 may obtain second information of the audio output device 350 connected to the USB connector 520 separately from the first information through the USB notify driver 630, USB PHY driver 631, USB host interface (XHCI) 632, USB host controller driver (HCD) 633, USB core & hub driver 634 of the USB driver 517, and the USB host manager 640, USB advanced Linux sound architecture (ALSA) manager 641, USB ALSA device (642) of the USB framework 515.

When the second information of the audio output device 350 is received, the audio framework 513 may open a sound card (e.g., soundcard info node 660) of the audio output device 350 and open the PCM node 670 finally to output an audio signal.

In the related art, the USB driver 517 may recognize the audio output device 350 by obtaining the first information and second information of the audio output device 350 connected to the USB connector 520 through the USB notify driver 630, USB PHY driver 631, USB host interface 632, USB host controller driver 633, USB core & hub driver 634 of the USB driver 517, and the USB host manager 640, USB ALSA manager 641, USB ALSA device 642 of the USB framework 515.

In one embodiment of the disclosure, the audio framework 513 for audio signal processing is put into the ready state by obtaining the first information in advance, an access is made to open the sound card of the audio output device 350 (e.g., to check whether the audio output device 350 is in a state capable of audio signal processing), and the sound card is opened upon obtaining the second information, which can shorten the time for recognizing the audio output device 350 compared with a related art method.

In one embodiment, the audio framework 513 may provide functions that can be supported by a component (e.g., sound output device 155 in FIG. 1) of the electronic device 301 or the audio output device 350 to enable an application (e.g., audio playback application 511) to perform audio output. The audio framework 513 may generate a control signal for controlling the sound output device 155 or the audio output device 350 based on the configuration information received from the audio playback application 511, and transmit the control signal to the audio driver 620.

In one embodiment, the audio framework 513 may generate a control signal for controlling the audio output device 350 based on the configuration information received from the audio playback application 511, and transmit audio-related data (e.g., pulse code modulation (PCM) data corresponding to audio, and audio output path) and the control signal to the audio driver 620.

In one embodiment, the audio driver 620 may transmit the control signal received from the audio framework 513 to the USB driver 517, so that the audio output device 350 connected to the USB connector 520 can output audio. For example, the electronic device 301 may transmit audio-related data to the audio output device 350. The processor (e.g., processor 550 in FIG. 5) of the audio output device 350 may receive audio-related data and output the audio-related data through the corresponding speaker (e.g., speaker 570 in FIG. 5).

In one embodiment, the audio playback application 511 may refer to an application for controlling functions related to audio playback (e.g., audio output activation or deactivation, volume adjustment during audio reproduction, or audio equalization). The audio playback application 511 may provide a user interface that enables the user to control the functions related to audio playback. When a user input is received on the user interface, the audio playback application 511 may transmit the configuration information corresponding to the received user input to the audio framework 513.

Figure 7:
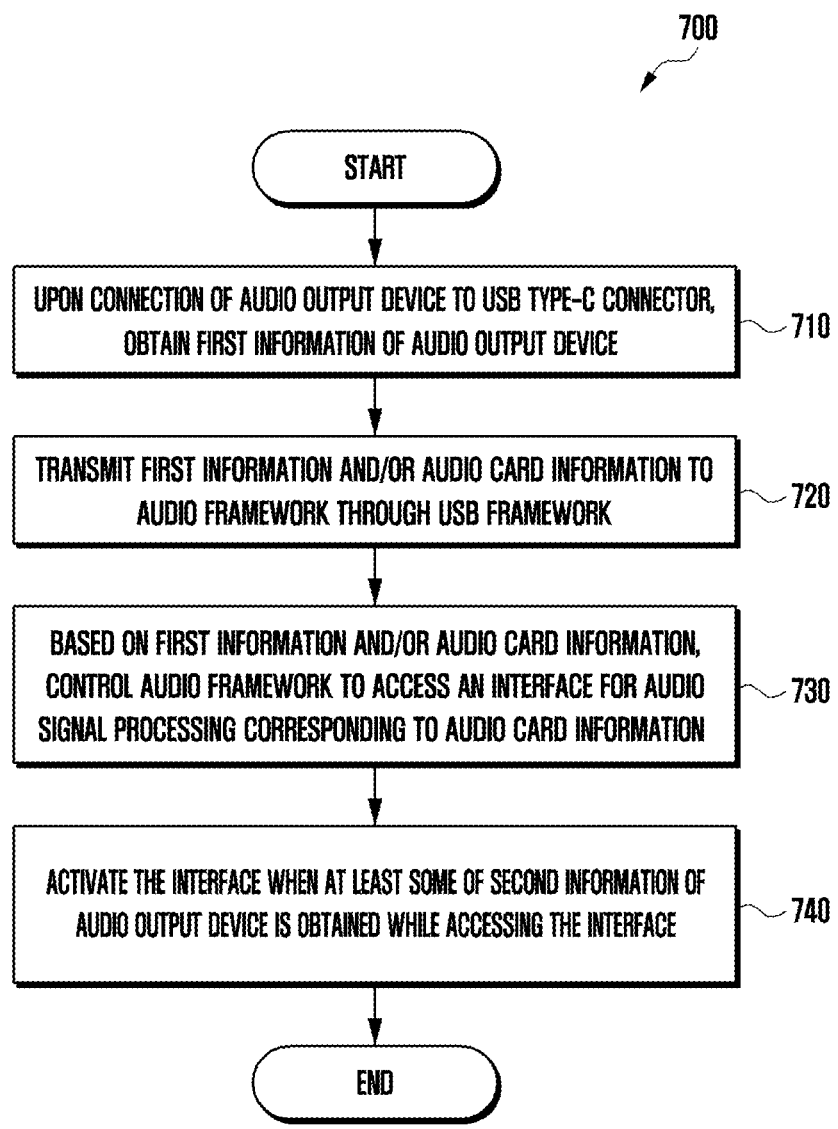
FIG. 7 illustrates a flowchart of a method for the electronic device to recognize an audio output device according to various embodiments.

FIG. 7 illustrates a flowchart 700 of a method for the electronic device 301 to recognize an audio output device 350 according to various embodiments.

With reference to FIG. 7, at operation 710, in response to connection of an audio output device (e.g., audio output device 350 in FIG. 3) to the USB Type-C connector (e.g., USB connector 520 of FIG. 5), the USB driver (e.g., USB driver 517 in FIG. 5) of the processor (e.g., processor 510 in FIG. 5) may obtain first information of the audio output device 350. For example, the processor 510 may activate VBUS in response to connection of the connector (e.g., connector 380 in FIG. 3) of the audio output device 350 to the USB Type-C connector 520. The audio output device 350 may start to operate with power received through VBUS. When the signal line of terminal A6/B6 (D+) among plural terminals provided in the USB Type-C connector 520 is pulled up, the electronic device (e.g., electronic device 301 in FIG. 3) may detect that terminal A6/B6 (D+) is pulled up, and perform a series of preparation operations (e.g., enumeration) for data transmission with the audio output device 350.

In one embodiment, while a series of preparation operations (e.g., enumeration) are performed for data transmission between the electronic device 301 and the audio output device 350, the first information of the audio output device 350 may be obtained from the audio output device 350. For example, the first information of the audio output device 350 may include a vendor identification (VID) indicating manufacturer information of the audio output device 350 and a product identification (PID) indicating the product.

In one embodiment, operation 710 may be performed while an audio signal is output through the speaker (e.g., sound output device 155 of FIG. 1) of the electronic device 301.

In one embodiment, at operation 720, the processor 510 (e.g., USB driver 517) may transmit the first information and/or the audio card information of the audio output device 350 to the audio framework (e.g., audio framework 513 in FIG. 5) through the USB framework (e.g., USB framework 515 in FIG. 5).

In one embodiment, operation 720 of transmitting the first information and/or audio card information of the audio output device 350 to the audio framework 513 through the USB framework 515 may correspond to an operation for putting the audio framework 513 into the ready state so as to enable the audio output device 350 to process an audio signal using an interface corresponding to the audio card information.

In one embodiment, at operation 730, the processor 510 may control the audio framework 513 to access an interface for audio signal processing corresponding to the audio card information, based on the first information and/or the audio card information of the audio output device 350. For example, the audio framework 513 may attempt to access the audio card corresponding to the audio card information at specified time intervals based on the first information and/or audio card information of the audio output device 350 obtained from the USB framework 515.

In one embodiment, at operation 740, when at least a portion of the second information of the audio output device 350 is obtained while accessing the interface, the processor 510 may activate the interface for audio signal processing.

In one embodiment, as described above with reference to FIG. 6, the processor 510 may obtain the second information of the audio output device 350 connected to the USB connector 520 through the USB notify driver 630, USB PHY driver 631, USB host interface 632, USB host controller driver 633, USB core & hub driver 634 of the USB driver 517, and the USB host manager 640, USB ALSA manager 641, USB ALSA device 642 of the USB framework 515 while performing a series of preparation operations for data transmission with the audio output device 350.

In one embodiment, when at least a portion of the second information of the audio output device 350 is obtained as the execution of a series of preparation operations for data transmission with the audio output device 350 is completed, the processor 510 may determine that a node for the audio output device 350 has been created and may activate an interface (e.g., interface corresponding to audio card information) for audio signal processing through the audio output device 350.

In one embodiment, the second information of the audio output device 350 may include information regarding presence of a speaker, presence of a microphone, number of interfaces supported by the audio output device 350, sample rate for each interface, bit rate, channel information, and/or endpoint.

In one embodiment, when the audio output device 350 is connected to the USB Type-C connector 520, the USB driver 517 may generate a node representing information of the audio output device 350. For example, the node may be an interface that allows access to the kernel to output an audio signal through the audio output device 350.

In one embodiment, the processor 510 may put the audio framework 513 into the ready state by obtaining the first information of the audio output device 350, and may access an audio card to be generated at specified time intervals by using the audio framework 513 put into the ready state. When at least some of the second information about the audio output device 350 is obtained while accessing the audio card, the processor 510 may activate an interface for audio signal processing through connection with the audio output device 350 (e.g., generation of a node representing information of the audio output device 350), which may reduce the time for recognizing the audio output device 350.

In one embodiment, although not shown, the processor 510 may transmit an audio signal to the audio output device 350 through the activated interface.

In one embodiment, although not shown, the processor 510 may map the generated node indicating information about the audio output device 350, for example, first information, second information, and/or audio card information to the identification information (e.g., VID or PID) of the audio output device 350, and store the mapping result in the memory (e.g., memory 530 in FIG. 5).

In one embodiment, it has been described at operation 720 of FIG. 7 that the USB driver 517 transmits the first information of the connected audio output device 350 to the audio framework 513 through the USB framework 515. However, it is not limited thereto. In another embodiment, the USB driver 517 may transmit the first information and/or audio card information to be generated of the connected audio output device 350 to the audio framework 513 without passing through the USB framework 515.

In one embodiment, it has been described at operation 710 that VBUS activation is performed by the USB driver 517 in response to connection of the connector 380 of the audio output device 350 to the USB Type-C connector 520. However, it is not limited thereto. For example, in response to connection of the connector 380 of the audio output device 350 to the USB Type-C connector 520, VBUS activation may be performed by the PDIC driver (e.g., PDIC driver 610 in FIG. 6). Compared with the case where VBUS activation is performed by the USB driver 517, when VBUS activation is performed by the PDIC driver 610, as the timing of performing a series of preparation operations (e.g., enumeration) for data transmission with the audio output device 350 becomes also earlier, the time for recognizing the audio output device 350 may be shortened.

Figure 8:
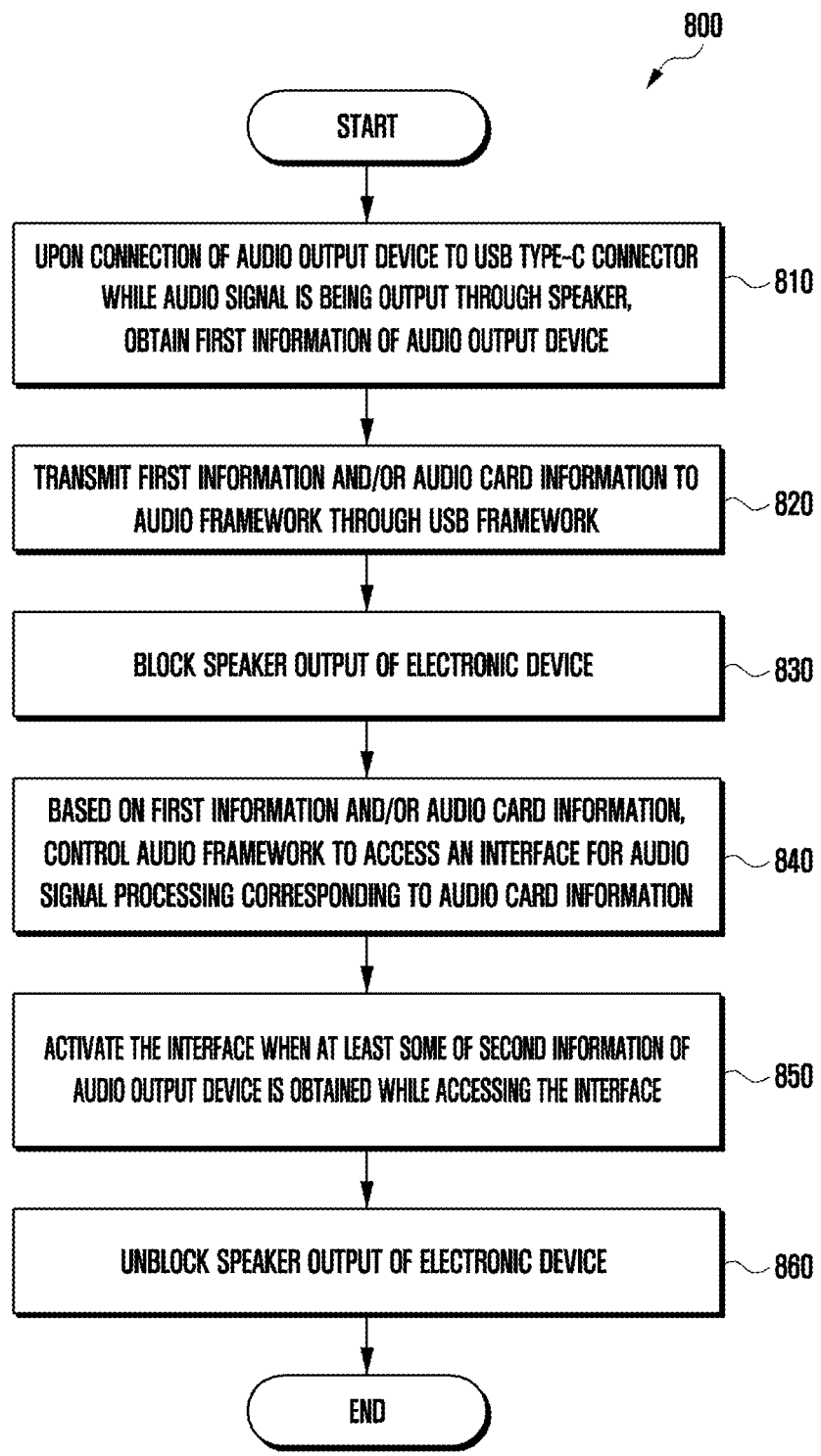
FIG. 8 illustrates a flowchart of a method for the electronic device to recognize an audio output device according to various embodiments.

FIG. 8 illustrates a flowchart 800 of a method for the electronic device 301 to recognize an audio output device 350 according to various embodiments.

In one embodiment, as operations 810, 820, 840 and 850 of FIG. 8 are identical respectively to operations 710, 720, 730 and 740 of FIG. 7 described above, detailed descriptions thereof may be replaced with corresponding descriptions with reference to FIG. 7.

With reference to FIG. 8, at operation 810, in response to connection of an audio output device (e.g., audio output device 350 in FIG. 3) to the USB Type-C connector (e.g., USB connector 520 in FIG. 5) while outputting an audio signal through the speaker (e.g., sound output device 155 in FIG. 1) of the electronic device 301, the USB driver (e.g., USB driver 517 in FIG. of the processor (e.g., processor 510 in FIG. 5) may obtain the first information of the audio output device 350. The first information of the audio output device 350 may include a vendor identification (VID) indicating manufacturer information of the audio output device 350 and a product identification (PID) indicating the product.

In one embodiment, at operation 820, the processor 510 (e.g., USB driver 517) may transmit the first information and/or the audio card information of the audio output device 350 to the audio framework (e.g., audio framework 513 in FIG. 5) through the USB framework (e.g., USB framework 515 in FIG. 5).

In one embodiment, at operation 830, the processor 510 may block (e.g., mute) the output of the speaker of the electronic device (e.g., electronic device 301 of FIG. 3). When the first information and/or audio card information of the audio output device 350 is obtained after the audio output device 350 is connected to the USB Type-C connector 520, as the speaker output is blocked, an audio signal may be not output through the speaker of the electronic device 301.

In one embodiment, at operation 840, the processor 510 may control the audio framework 513 to access an interface for audio signal processing corresponding to the audio card information, based on the first information and/or the audio card information of the audio output device 350.

In one embodiment, at operation 850, when at least a portion of the second information of the audio output device 350 is obtained while accessing the interface, the processor 510 may activate the interface for audio signal processing. Upon activation of the interface for audio signal processing, at operation 860, the processor 510 may unblock the speaker output of the electronic device 301. For example, as the connection of the audio output device 350 is recognized (e.g., a state in which the audio output device 350 can process an audio signal) due to the activation of the interface, the audio signal output path may be changed from the speaker of the electronic device 301 to the audio output device 350 (e.g., speaker 570 in FIG. 5).

In one embodiment, although not shown, the processor 510 may transmit an audio signal to the audio output device 350 through the activated interface. For example, the audio output device 350 may output an audio signal received from the electronic device 301 through the speaker 570.

In various embodiments, the speaker output is blocked in FIG. 8 in addition to the embodiment of FIG. 7 where the first information and/or audio card information of the audio output device 350 connected to the USB Type-C connector 520 is transmitted to the audio framework 513, so that the time for recognizing the audio output device 350 may be shortened (e.g., about 300 ms to 400 ms).

Figure 9:
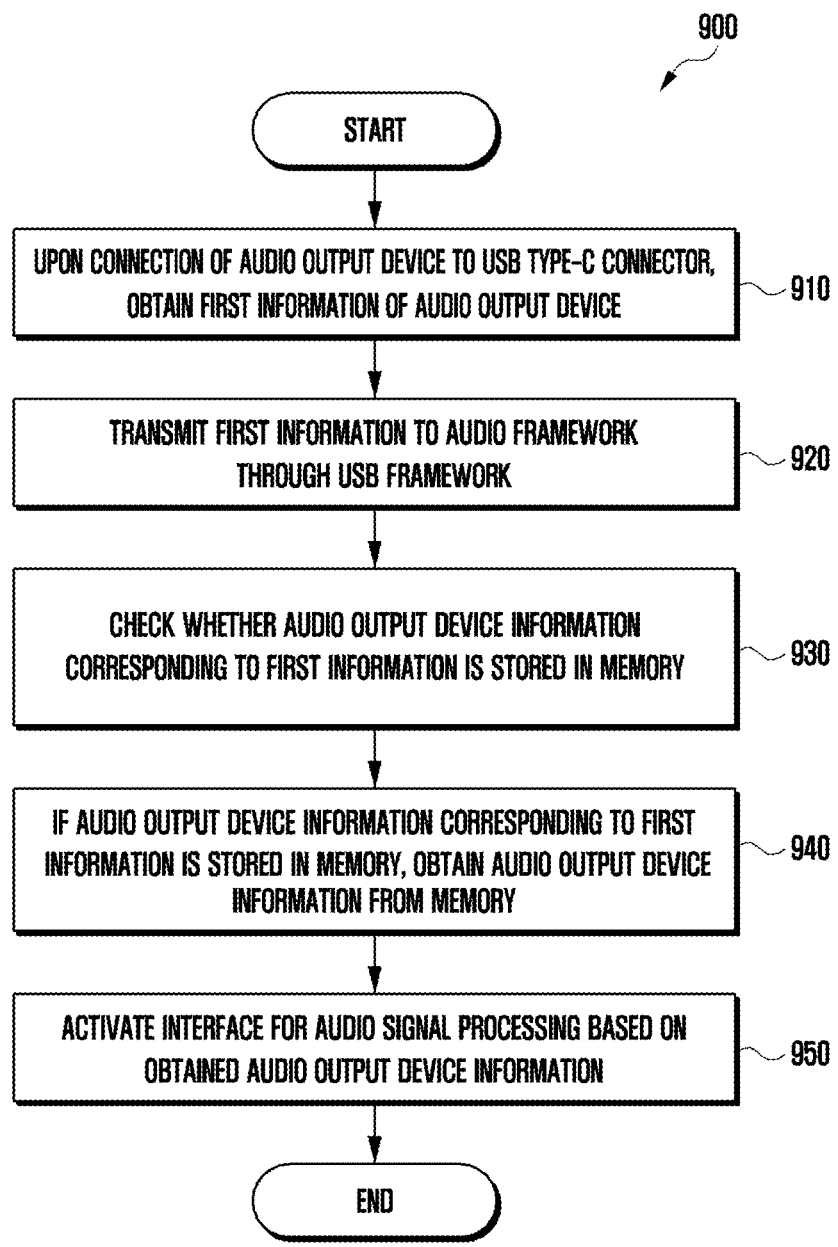
FIG. 9 illustrates a flowchart of a method for the electronic device to recognize an audio output device according to various embodiments.

FIG. 9 illustrates a flowchart 900 of a method for the electronic device 301 to recognize an audio output device 305 according to various embodiments.

In one embodiment, as operations 910 and 920 of FIG. 9 are identical respectively to operations 710 and 720 of FIG. 7 described above, detailed descriptions thereof may be replaced with corresponding descriptions with reference to FIG. 7.

With reference to FIG. 9, at operation 910, in response to connection of an audio output device (e.g., audio output device 350 in FIG. 3) to the USB Type-C connector (e.g., USB connector 520 in FIG. 5) while outputting an audio signal through the speaker (e.g., sound output device 155 in FIG. 1) of the electronic device (e.g., electronic device 301 in FIG. 3), the USB driver (e.g., USB driver 517 in FIG. 5) of the processor (e.g., processor 510 in FIG. 5) may obtain the first information of the audio output device 350. At operation 920, the processor 510 (e.g., USB driver 517) may transmit the first information of the audio output device 350 to the audio framework (e.g., audio framework 513 in FIG. 5) through the USB framework (e.g., USB framework 515 in FIG. 5).

In one embodiment, at operation 930, the processor 510 may check whether audio output device corresponding to the first information of the audio output device 350 is stored in the memory (e.g., memory 530 in FIG. 5). The first information of the audio output device 350 may include a vendor identification (VID) indicating manufacturer information of the audio output device 350 and a product identification (PID) indicating the product. Based on the first information such as VID and PID obtained from the audio output device 350, the processor 510 may determine whether audio output device matching the VID and PID is present in the memory 530.

In one embodiment, if audio output device corresponding to the first information is stored in the memory 530, at operation 940, the processor 510 may obtain information on the audio output device 350 from the memory 530. For example, if audio output device matching the first information of the audio output device 350 such as VID and PID exists in the memory 530, the processor 510 may obtain information of the audio output device 350 mapped to the VID and PID, such as second information and audio card information, from the memory 530. The second information of the audio output device 350 may include information regarding presence of a speaker, presence of a microphone, number of interfaces supported by the audio output device 350, sample rate for each interface, bit rate, channel information, and/or endpoint.

In one embodiment, at operation 950, the processor 510 may activate an interface for audio signal processing based on the information of the audio output device 350 obtained from the memory 530.

In one embodiment, if audio output device corresponding to the first information is not stored in the memory 530, the processor 510 may perform operations 730 and 740 of FIG. 7 described above.

In the embodiment of FIG. 9, when audio output device corresponding to the first information is stored in the memory 530, as the interface is activated upon obtaining the second information and audio card information of the audio output device 350 from the memory 530, the connection of the audio output device 350 may be recognized (e.g., in a state where the audio output device 350 can process audio signals). As the stored second information and audio card information of the audio output device 350 are obtained from the memory 530, it is not necessary to obtain the second information and audio card information of the audio output device 350 whenever the audio output device 350 is connected to the USB Type-C connector 520, so that the time taken to recognize the audio output device 350 can be reduced.

Figure 10:
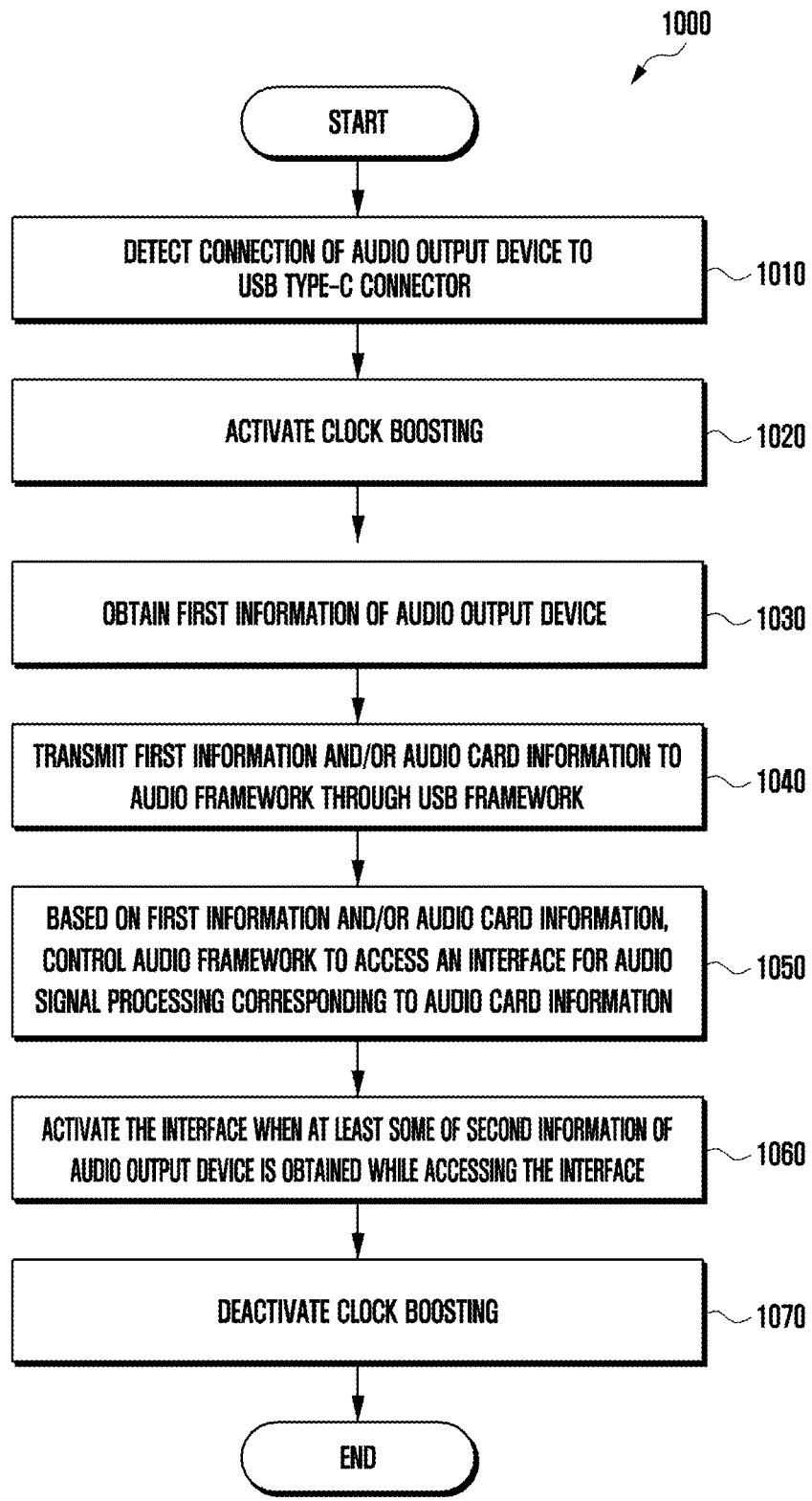
FIG. 10 illustrates a flowchart of a method for the electronic device to recognize an audio output device according to various embodiments.

FIG. 10 is a flowchart 1000 of a method for the electronic device 301 to recognize an audio output device 350 according to various embodiments.

In one embodiment, as operations 1040, 1050 and 1060 of FIG. 10 are identical respectively to operations 720, 730 and 740 of FIG. 7 described above, detailed descriptions thereof may be replaced with corresponding descriptions with reference to FIG. 7.

With reference to FIG. 10, at operation 1010, the USB driver (e.g., USB driver 517 in FIG. 5) of the processor (e.g., processor 510 in FIG. 5) may detect that an audio output device (e.g., audio output device 350 in FIG. 3) is connected to the USB Type-C connector (e.g., USB connector 520 of FIG. 5). At operation 1010, the connection may be detected while an audio signal is output through the speaker (e.g., sound output device 155 in FIG. 1) of the electronic device (e.g., electronic device 301 in FIG. 3).

In one embodiment, at operation 1020, the processor 510 may activate clock boosting. For example, the clock may include an application processor (AP) clock, a memory interface (MIF) clock, and a USB bus clock. In one embodiment, activating clock boosting upon detecting connection of the audio output device 350 to the USB type C connector 520 may improve the performance of the electronic device 301.

In one embodiment, at operation 1030, the processor 510 may obtain first information of the connected audio output device 350. For example, while performing a series of preparation operations (e.g., enumeration) for data transmission between the electronic device 301 and the audio output device 350 in a state where clock boosting is activated, the processor 510 may obtain first information of the audio output device 350 from the audio output device 350.

In one embodiment, at operation 1040, the processor 510 (e.g., USB driver 517) may transmit the first information and/or audio card information of the audio output device 350 to the audio framework 513 through the USB framework (e.g., USB framework 515 in FIG. 5). At operation 1050, based on the first information of the audio output device 350, the processor 510 may control the audio framework 513 to access an interface for audio signal processing corresponding to the audio card information.

In one embodiment, at operation 1060, when at least a portion of the second information of the audio output device 350 is obtained while accessing the interface, the processor 510 may activate the interface for audio signal processing.

In one embodiment, at operation 1070, the processor 510 may deactivate clock boosting.

In the embodiment of FIG. 10, the processor 510 may activate clock boosting in response to connection of the audio output device 350 to the USB Type-C connector 520, and may deactivate clock boosting when recognition of the audio output device 350 is completed. In other words, after the audio output device 350 is connected to the USB connector, the processor 510 may activate clock boosting until the audio output device 350 is recognized (e.g., activation of an interface for audio signal processing) and perform operations for recognizing the connection of the audio output device 350 while the performance of the electronic device 301 is improved due to activation of clock boosting, so that the time for recognizing the audio output device 350 can be shortened.

Figure 11:
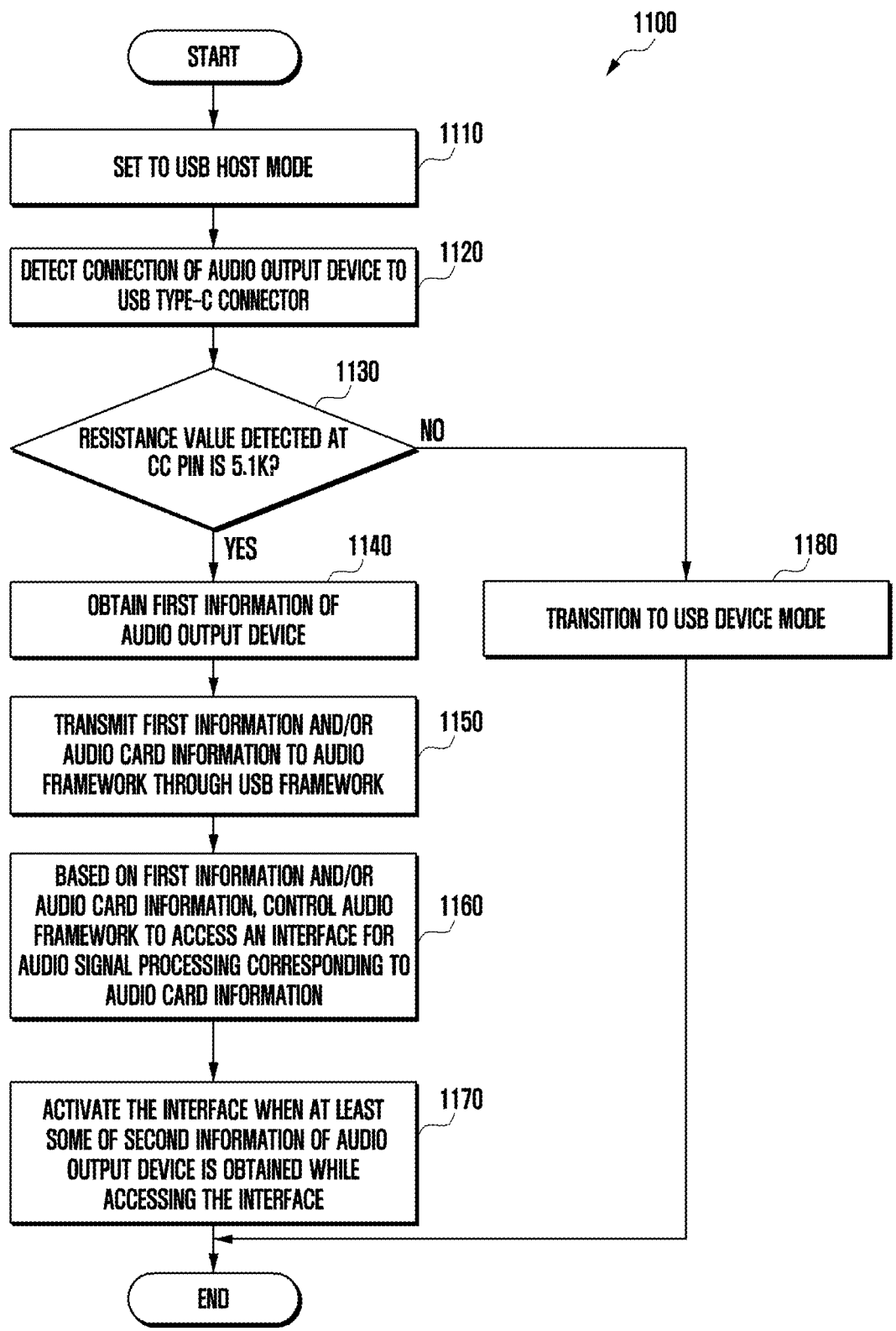
FIG. 11 illustrates a flowchart of a method for the electronic device to recognize an audio output device according to various embodiments.

FIG. 11 illustrates a flowchart 1100 of a method for the electronic device 301 to recognize an audio output device 350 according to various embodiments.

In one embodiment, as operations 1150, 1160 and 1070 of FIG. 11 are identical respectively to operations 720, 730 and 740 of FIG. 7 described above, detailed descriptions thereof may be replaced with corresponding descriptions with reference to FIG. 7.

In various embodiments, the electronic device 301 may be a dual role device supporting a USB host mode and a USB device mode. When the audio output device (e.g., audio output device 350 in FIG. 3) is connected to the USB Type-C connector (e.g., USB connector 520 in FIG. 5) of the electronic device (e.g., electronic device 301 in FIG. 3) and the role is determined accordingly by the PDIC driver (e.g., PDIC driver 610 in FIG. 6), the electronic device 301 may determine whether to operate in the USB host mode (e.g., mode for supplying power to the audio output device 350 connected to the USB Type-C connector 520 and/or mode for transmitting data) or in the USB device mode.

In the embodiment of FIG. 11, the electronic device 301 initially sets its mode to the USB host mode and remains in the USB host mode without having to switch between the USB host mode and the USB device mode when the audio output device 350 is connected to the USB Type-C connector 520, so that the time for recognizing the audio output device 350 can be shortened.

With reference to FIG. 11, at operation 1110, the processor (e.g., processor 510 in FIG. 5) may configure the electronic device 301 to operate in the USB host mode.

In one embodiment, at operation 1120, the USB driver (e.g., USB driver 517 in FIG. 5) of the processor 510 may detect connection of an audio output device 350 to the USB Type-C connector 520.

In one embodiment, at operation 1130, the processor 510 may check whether the resistance value detected at the CC pin is 5.1 k. If the resistance value detected at the CC pin is at operation 1140, the processor 510 may obtain the first information of the audio output device 350. At operation 1150, the processor 510 (e.g., USB driver 517) may transmit the obtained first information and/or audio card information of the audio output device 350 to the audio framework 513 through the USB framework (e.g., USB framework 515 in FIG. 5). At operation 1160, based on the first information and/or the audio card information of the audio output device 350, the processor 510 may control the audio framework 513 to access an interface for audio signal processing corresponding to the audio card information. At operation 1170, when at least a portion of the second information of the audio output device 350 is obtained while accessing the interface, the processor 510 may activate the interface for audio signal processing.

In one embodiment, if the resistance value detected at the CC pin is not 5.1 k, at operation 1180, the processor 510 may transition to the USB device mode.

According to various embodiments of the disclosure, as the operations of FIGS. 7 to 11 are performed, the time for recognizing the audio output device 350 may be shortened as shown in Table 1 below. For example, in the related art, after the audio output device 350 is connected to the USB Type-C connector 520, as information about the audio output device 350 is obtained through the PDIC driver 610, the USB driver 517, the audio driver 620, the USB framework 515, and the audio framework 513, it may take 2.1 seconds for the audio output device 350 to be recognized. In various embodiments of the disclosure, when the audio output device 350 is connected to the USB Type-C connector 520, some information of the audio output device 350 is obtained in advance and the USB framework 515 is controlled to transmit the obtained information of the audio output device 350 to the audio framework 513 for audio processing, so that the time for recognizing the audio output device 350 may be shortened from 2.1 seconds of the related art to 1.2 seconds.

TABLE 1

|  | Related art | Present disclosure |
|---|---|---|
| Time to recognize audio output device | 2.1 | 1.2 |
| Time to switch audio signal to audio output device | 0.5 | 0.5 |

According to various embodiments, a method for the electronic device 301 to recognize an audio output device 350 may include: obtaining, in response to connection of the audio output device 350 to a USB Type-C connector 520 including at least one configuration channel (CC) pin, first information of the audio output device 350; transmitting the first information and/or audio card information of the audio output device 350 to an audio framework 513 through a USB framework 515; accessing an interface corresponding to the audio card information based on the first information and/or the audio card information of the audio output device 350; and activating the interface when at least a portion of second information of the audio output device 350 is obtained while accessing the interface and the at least a portion of the second information is transmitted to the audio framework 513 through the USB framework 515.

According to various embodiments, the first information of the audio output device 350 may include a vendor identification (VID) indicating manufacturer information of the audio output device 350 and a product identification (PID) indicating the product.

According to various embodiments, the method may further include outputting an audio signal through a speaker (not shown) of the electronic device 301 before detecting the connection of the audio output device 350 to the USB Type-C connector 520.

According to various embodiments, the method may further include blocking the output of the speaker (not shown) after transmitting the first information and/or the audio card information to the audio framework 513 through the USB framework 515.

According to various embodiments, the method may further include unblocking the output of the speaker upon activation of the interface.

According to various embodiments, the method may further include: determining, after obtaining the first information of the audio output device 350, whether audio output device matching the first information is present in the memory (e.g., memory 530 in FIG. 5); obtaining, upon determining that audio output device matching the first information is present in the memory, information about the audio output device 350 and audio card information corresponding to the audio output device 350 from the memory 530; and activating the interface based on the information about the audio output device 350 and the audio card information obtained from the memory 530.

According to various embodiments, the method may further include activating clock boosting in response to connection of the audio output device 350 to the USB Type-C connector 520.

According to various embodiments, the method may further include deactivating clock boosting in response to activation of the interface.

According to various embodiments, the method may further include configuring the electronic device 301 to operate in a USB host mode. Obtaining first information of the audio output device 350 may include: checking whether the resistance value detected at the CC pin is 5.1 k; and obtaining, if the resistance value detected at the CC pin is 5.1 k, the first information of the audio output device 350 while maintaining the USB host mode.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a connector;
   a processor operatively connected to the connector; and
   memory storing instructions that, when executed by the processor, cause the electronic device to:
      obtain, in response to connection of an audio output device to the connector, first information related to identification information of the audio output device;
      responsive to obtaining the first information related to the identification information of the audio output device, set an audio framework to be in a ready state such that the audio framework can access an interface for processing an audio signal;
      identify whether the audio output device corresponding to the obtained first information exists in the memory;
      obtain, if the audio output device corresponding to the first information exists in the memory, at least a portion of second information related to an attribute of the audio output device and interface information related to the interface for processing the audio signal from the memory;
      responsive to obtaining the at least a portion of the second information and the interface information from the memory, activate the interface; and
      transmit an audio signal to the audio output device through the activated interface.

2. The electronic device of claim 1, wherein the first information related to the identification information of the audio output device includes a vendor identification (VID) indicating manufacturer information of the audio output device and a product identification (PID) indicating a product.

3. The electronic device of claim 1, wherein the second information related to the attribute of the audio output device includes at least one of presence of a speaker, presence of a microphone, number of interfaces supported by the audio output device, sample rate for each interface, bit rate, channel information, or endpoint.

4. The electronic device of claim 1, wherein the memory stores the instructions that, when executed by the processor, cause the electronic device to:
   obtain, if the audio output device corresponding to the first information does not exist in the memory, the interface information by using a USB driver;
   transmit the first information and the interface information to an audio framework through a USB framework;
   control the audio framework to access the interface based on the first information and the interface information; and
   wherein the interface is activated by transmitting the at least a portion of the second information to the audio framework through the USB framework.

5. The electronic device of claim 4, further comprising a speaker; and
   wherein the memory stores the instructions that, when executed by the processor, cause the electronic device to:
      detect connection of the audio output device to the connector while outputting the audio signal through the speaker.

6. The electronic device of claim 5, wherein the memory stores the instructions that, when executed by the processor, cause the electronic device to:
      block an output of the speaker after transmitting the first information and the interface information to the audio framework through the USB framework.

7. The electronic device of claim 6, wherein the memory stores the instructions that, when executed by the processor, cause the electronic device to: unblock the blocked output of the speaker in response to activation of the interface.

8. The electronic device of claim 4, wherein the memory stores the instructions that, when executed by the processor, cause the electronic device to:
      activate clock boosting upon connection of the audio output device to the connector.

9. The electronic device of claim 8, wherein the memory stores the instructions that, when executed by the processor, cause the electronic device to: deactivate activated clock boosting upon activation of the interface.

10. The electronic device of claim 4, wherein the connector comprising a USB Type C connector including at least one configuration channel (CC) pin.

11. The electronic device of claim 10, wherein the memory stores the instructions that, when executed by the processor, cause the electronic device to:
      set the electronic device to operate in a USB host mode;
      check, upon connection of the audio output device to the connector, whether a resistance value detected at the CC pin is 5.1 k; and
      obtain the first information of the audio output device while maintaining the USB host mode in response to the resistance value detected at the CC pin being 5.1 k.

12. A method for an electronic device to recognize an audio output device, the method comprising:
   obtaining first information related to identification information of the audio output device in response to connection of the audio output device to a connector;
   responsive to obtaining the first information related to the identification information of the audio output device, setting an audio framework of the electronic device to be in a ready state such that the audio framework can access an interface for processing an audio signal;
   identifying whether the audio output device corresponding to the obtained first information exists in a memory;
   obtaining, if the audio output device corresponding to the first information exists in the memory, at least a portion of second information related to an attribute of the audio output device and interface information related to the interface for processing the audio signal from the memory;
   responsive to obtaining the at least a portion of the second information and the interface information from the memory, activating the interface; and
   transmitting an audio signal to the audio output device through the activated interface.

13. The method of claim 12, wherein the first information related to the identification information of the audio output device includes a vendor identification (VID) indicating manufacturer information of the audio output device and a product identification (PID) indicating a product, and
wherein the second information related to the attribute of the audio output device includes at least one of presence of a speaker, presence of a microphone, number of interfaces supported by the audio output device, sample rate for each interface, bit rate, channel information, or endpoint.

14. The method of claim 12, further comprising:
obtaining, if the audio output device corresponding to the first information does not exist in the memory, the interface information by using a USB driver;
transmitting the first information and the interface information to an audio framework through a USB framework;
controlling the audio framework to access the interface based on the first information and the interface information; and
wherein activating the interface comprises transmitting the at least a portion of the second information to the audio framework through the USB framework.

15. The method of claim 14, further comprising:
outputting the audio signal through a speaker of the electronic device before detecting connection of the audio output device to the connector.

16. The method of claim 15, further comprising:
blocking an output of the speaker after transmitting the first information and the interface information to the audio framework through the USB framework.

17. The method of claim 16, further comprising:
unblocking the blocked output of the speaker upon activation of the interface.

18. The method of claim 14, further comprising:
activating clock boosting in response to connection of the audio output device to the connector.

19. The method of claim 18, further comprising:
deactivating activated clock boosting in response to activation of the interface.

20. The method of claim 14, wherein the connector comprising a USB Type C connector including at least one configuration channel (CC) pin,
further comprising:
setting the electronic device to operate in a USB host mode; and wherein obtaining first information of the audio output device comprises:
checking whether a resistance value detected at the CC pin is 5.1 k; and
obtaining the first information of the audio output device while maintaining the USB host mode in response to the resistance value detected at the CC pin being 5.1 k.

* * * * *